United States Patent
Rzadki et al.

(10) Patent No.: US 7,172,474 B2
(45) Date of Patent: Feb. 6, 2007

(54) ELECTRIC ENERGY SUPPLY SYSTEM FOR A SHIP, IN PARTICULAR A NAVY SHIP THAT CAN BE OPERATED WITH LOW IR SIGNATURE

(75) Inventors: Wolfgang Rzadki, Glinde (DE); Karl-Otto Sadler, Hamburg (DE); Hannes Schulze Horn, Gladbeck (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 10/497,150

(22) PCT Filed: Jun. 27, 2003

(86) PCT No.: PCT/DE03/02152

§ 371 (c)(1),
(2), (4) Date: Sep. 21, 2004

(87) PCT Pub. No.: WO2004/007278

PCT Pub. Date: Jan. 22, 2004

(65) Prior Publication Data

US 2005/0037242 A1    Feb. 17, 2005

(30) Foreign Application Priority Data

Jul. 10, 2002    (DE) ................. 102 31 152

(51) Int. Cl.
*B60L 11/02*    (2006.01)
(52) U.S. Cl. .............................. 440/6; 440/1
(58) Field of Classification Search .......... 440/1, 440/6; 290/4 R; 307/64; 429/22, 23, 19, 429/25

See application file for complete search history.

(56) References Cited

U.S. PATENT DOCUMENTS

| | | | | |
|---|---|---|---|---|
| 5,678,647 A | * | 10/1997 | Wolfe et al. .................. | 429/23 |
| 5,969,435 A | * | 10/1999 | Wilhelm ....................... | 307/64 |
| 6,188,139 B1 | * | 2/2001 | Thaxton et al. ............. | 290/4 R |
| 6,503,649 B1 | * | 1/2003 | Czajkowski et al. .......... | 429/23 |

FOREIGN PATENT DOCUMENTS

| | | |
|---|---|---|
| DE | 29 11 830 A1 | 10/1980 |
| DE | 35 19 599 A1 | 1/1986 |
| DE | 38 25 563 A1 | 2/1990 |
| DE | 199 62 681 A1 | 6/2001 |
| DE | 100 24 657 A1 | 11/2001 |
| EP | 0 282 462 B1 | 10/1991 |

* cited by examiner

*Primary Examiner*—Lars A. Olson
(74) *Attorney, Agent, or Firm*—Harness, Dickey & Pierce, P.L.C.

(57) ABSTRACT

The invention relates to an electric energy supply system for a ship, in particular for a navy ship that can be operated with a low IR signature and that is configured as an <<all electric ship>> (AES). Said system comprises a direct current network (DC), supplied by fuel cells, as a ship electrical system and network for normal propulsion and an alternating current network (AC) comprising generators, in particular for generating energy for high-speed propulsion. According to the invention, the generators are motor-driven, e.g. by means of at least one gas turbine or one diesel motor, preferably supercharged and the AC and DC network are interconnected in such a way that electric energy can be exchanged between them, in particular that electric energy can be withdrawn from the DC network and transferred to the AC network to start the motor-driven propulsion.

45 Claims, 2 Drawing Sheets

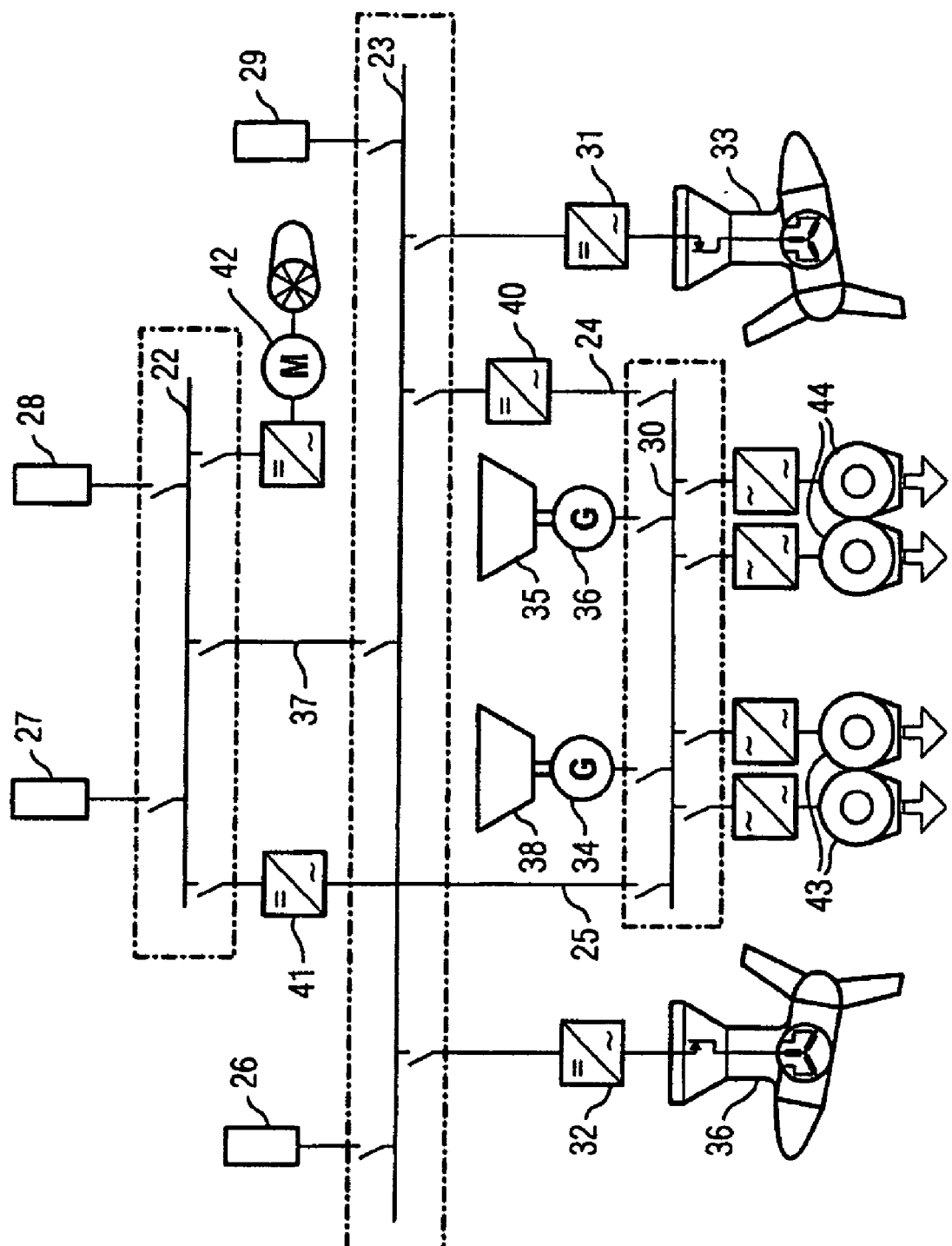

ELECTRIC ENERGY SUPPLY SYSTEM FOR A SHIP, IN PARTICULAR A NAVY SHIP THAT CAN BE OPERATED WITH LOW IR SIGNATURE

This application is the national phase under 35 U.S.C. § 371 of PCT International Application No. PCT/DE2003/002152 which has an International filing date of Jun. 27, 2003, which designated the United States of America and which claims priority on German Patent Application number DE 10231152.8 filed Jul. 10, 2002, the entire contents of which is hereby incorporated herein by reference.

FIELD OF THE INVENTION

The invention generally relates to an electrical power supply system for a ship. In particular, it relates to one for a navy ship which can be operated with a low IR signature, which is in the form of an "All Electric Ship" (AES) having a DC power supply (DC), which is fed from fuel cells, as the ship power supply system and as a power supply system for normal speed propulsion systems. The system further preferably includes an AC power supply system (AC) with generators, in particular for power generation for high-speed propulsion systems. The generators are preferably motor-driven, for example by at least one gas turbine or a diesel engine, preferably a supercharged diesel engine.

BACKGROUND OF THE INVENTION

An electrical power supply system for water vessels, which corresponds to the power supply system described above, is known from German Patent Application 101 02 741.9, Date of Filing: Jan. 22, 2001, which was not published prior to this.

SUMMARY OF THE INVENTION

An object of an embodiment of the invention is to specify a refinement of a corresponding electrical power supply system for a ship. Preferably, the refinement satisfies the particularly stringent requirements for a navy ship with special high-speed propulsion systems particularly well. Additionally, it preferably allows improved or even optimum use of all the power generating devices which are provided on the ship. In this case, the disclosure in German Patent Application 101 02 741.9 is also intended to be included in the disclosure of this patent application, and thus is incorporated herein by reference, in its entirety and for all purposes.

The particular requirements for a power supply system for an AES are taken into account in particular in that the AC and DC power supply systems are connected to one another such that electrical power can be interchanged between them, and in that electrical power is drawn from the DC power supply system and transferred to the AC power supply system in particular for starting the engine drives. It is thus advantageously possible to achieve a starting process with a low IR signature for high-speed propulsion systems.

A refinement of an embodiment of the invention provides that the exhaust gases from the engine drives for the generators are introduced into a reduced-pressure area at the base of the ship, with reduced pressure in the reduced pressure area being produced during operation of the high-speed propulsion system by the water which is accelerated directly or indirectly by the high-speed propulsion system. There is thus advantageously no need for an exhaust gas compressor and/or units for producing a reduced pressure in conjunction with the introduction of the exhaust gases into the water, even though the pressure here is up to one bar above the atmospheric pressure.

The introduction of the exhaust gases into a reduced-pressure area at the base of the ship advantageously also results in the exhaust gases being mixed particularly well with the water flowing around the base of the ship. Thus, since the exhaust gas bubbles which are formed do not rise until behind the stern of the ship where they merge into the stern vortices, this actually results in the ship being propelled in a manner in which the exhaust gases cannot be detected. When using a gas turbine or a diesel engine for supplying power to electric motors for water jets as high-speed propulsion systems, the exhaust gases are introduced into a coaxial exhaust-gas nozzle segment of the water jets, with the water jets being designed for operation at up to ten meters below the waterline of the ship. Use is thus advantageously made of the ejector effect of the water jets, while at the same time using the spin of the water jet. Overall, this results in a particularly good emission behavior of exhaust gases under the base of the ship.

When using diesel engines for the power supply for electric motors for propeller propulsion systems as high-speed propulsion systems, the exhaust gases are advantageously introduced into an underwater nozzle system, for example into a Venturi tube system or an annular gas outlet nozzle. Thus, the exhaust gases are introduced and distributed in the water in a functionally similar manner to that with a water jet with a coaxial exhaust gas nozzle segment, even if there is a certain increase in the drag. Even when using diesel engines which supply power to the propeller propulsion systems, an embodiment is thus possible which precludes infrared position-finding based on the exhaust gases.

A further refinement of an embodiment of the invention provides for a bypass for the exhaust gases from the engine propulsion systems to an outlet to be provided above the waterline, which may be used for starting the engine propulsion systems. It is thus also advantageously possible to start the engine propulsion systems even when reduced-pressure generation is not initially possible.

Within the scope of the embodiments of invention, provision is also made for the fuel cells for the DC power supply system to be not only fuel cells whose power can be increased quickly, for example PEM cells, but also fuel cells whose power can be increased more slowly, for example DMFC or SOFC cells or other cells which operate in the temperature range above that of the PEM cells (approximately 80° C.). A basic load supply and a peak load supply can thus also advantageously be achieved for the DC power supply system, with the combination of different fuel cells and types allowing a fuel cell power supply which is particularly cost-effective and whose efficiency is optimized. A power supply such as this can advantageously very well satisfy both the dynamic and the steady-state requirements for the power supply in a navy ship.

One refinement of an embodiment of the invention advantageously provides in this case for the various fuel cells to be operated in the media (gas/water) and heat combination and to feed electrical power into the DC power supply system jointly. If required, they can also operate jointly with one or more reformers. This may result in a very advantageous high efficiency with little heat being generated, in which case the remaining heat may also still be used, for example, for cooling purposes in an absorber cooling system.

The starting processes for the high-speed propulsion units are advantageously drawn from PEM cells, while the basis ship power supply is drawn from fuel cells with a higher operating temperature. The starting processes for the high-speed propulsion units require a large amount of energy, since the units must be accelerated by means of external energy up to the minimum operating rotation speed, that is to say the PEM cells must be able to supply a correspondingly large amount of power, and must be designed for this purpose.

For navy ships, it is particularly advantageous for fuel cells with a different dynamic response to be combined to form technically interacting units which are distributed in different ship areas. This results in a high degree of insensitivity to hits, since, even if severe damage occurs in individual ship areas, the power generation can continue in an optimized manner in the other ship areas.

A refinement of an embodiment of the invention advantageously provides for the fuel cells to have a DC switching system with a monitoring and control system, and with the power generation units for the high-speed propulsion systems likewise having an AC switching system with a monitoring and control system. This allows energy management matched to the requirement to be provided for both power supply systems. Both power supply systems can be controlled, regulated and monitored completely independently of one another. Even if one power supply system fails, the other power supply system remains fully serviceable, without any change.

Furthermore, one refinement of an embodiment of the invention provides for the AC monitoring and control system to be connected to pressure sensors, in particular to reduced-pressure sensors in the exhaust gas outlet reduced-pressure areas, and to pressure sensors in exhaust gas lines, and to be connected to valve and flap control devices and, possibly, to position sensors for valves and flaps. This therefore provides a basis for automation of the starting and acceleration processes of the individual power generators. With the aid of this, a monitoring and control system can be operated with exhaust gas control switching logic (automation system). It may have the conventional electronic automation components, such as actuating rate ramps, interlocks, etc. and may be operated particularly advantageously on the basis of Siemens SIMATIC S7 appliances and/or other devices/systems for handling automation processes remotely.

Appliances such as these are also available as high-availability SPS appliances which operate intrinsically in a redundant manner and which can advantageously carry out the entire automation process. In the normal form or in the high-availability form, they contribute in a particular manner to the reliability of the automation processes. Undesirable circuit states, which damage the propulsion system, can thus reliably be avoided; e.g. oil pressure in the bearings, fuel pressure and temperature, starting and ignition process etc., that is to say the starting conditions, can thus be maintained reliably.

If required, provision is made within the scope of the invention for the exhaust gas supply system to have a compressed-air feed subsystem, in particular for blowing out the reduced-pressure areas and/or for acceleration of the flow of the exhaust gases during the starting process. An aid is thus advantageously available for improving and accelerating the starting processes. The reliability of the starting process for the propulsion systems which are required to reach high speeds can thus be improved considerably. If the high-speed propulsion systems are driven by compressed-air-started diesel generator sets, their compressed-air reservoir can also be used.

Provision is also made within the scope of the invention for the power supply system to have a control system which operates at a higher level than the AC and DC switching systems with their respective monitoring and control systems, which higher-level control system matches the power generation and the power consumption of all the power generators and loads to one another, in particular with respect to the different dynamic responses of the power generators and loads. This makes it possible to avoid, in a battle for example, less power than is required being available for components of the navy ship which are required for survival. In this case, for example, in the relevant situation, unimportant loads, such as galleys, air-conditioning systems etc., are disconnected from the ship power supply system and all of the available power is concentrated on the equipment that is required for survival.

A refinement of an embodiment of the invention in this case provides for the AC and DC switching systems to be designed such that, when there is a high demand for power in the DC power supply system, for example when using high-energy weapons, it is possible to feed a maximum amount of power from the AC power supply system to the DC power supply system. Furthermore, in this context, provision is also made for the DC power supply system to have high-dynamic response energy stores, for example rechargeable battery banks or flywheel energy stores. These devices have the common feature that their operation can be used to cope with sudden demands for power to be made available in the ship power supply system. The AC and DC power supply systems are thus designed such that electrical power can be used from both power supply systems in order to meet the requirement.

The invention may be described in general form and by way of example as follows:

In order to minimize the IR signature of surface navy ships, the exhaust gases from diesel engines and/or gas turbines should be dissipated via coaxial exhaust gas nozzle segments or the like in conjunction with one or more water jets by making use of the pressure drop region (reduced pressure=suction) below the waterline as a water/exhaust gas mixture. An electrical circuit arrangement allows the water jets which are driven by electric propulsion motors to be started before the starting of the diesel engines and/or gas turbines which drive the electricity generators for generation of the electrical power for the water jets.

The power for the water jets is increased until an appropriate reduced-pressure region is formed in coaxial exhaust gas nozzle segments, or the like. Only then are the diesel engines and/or gas turbines started, with the exhaust gas supply being connected such that the exhaust gases are passed directly to the coaxial exhaust gas nozzle segment. Once the diesel engines and/or gas turbines have been accelerated, the generators take over the supply of the electrical power for the water jet motors. The power of the water jets can now be increased to their maximum possible power level. The same applies to high-speed propeller propulsion systems which may be used instead of the water jets, with the coaxial exhaust gas nozzle segments being replaced by axial exhaust gas nozzle segments.

The electrical circuit arrangement is designed as follows:

One to n fuel cell systems (BZA), by way of example four BZAs in FIG. 1, supply the propulsion and ship power supply system with electrical power without any emissions. The BZAs produce their electrical power in the form of a DC voltage. The BZAs normally supply the cruise speed propulsion system, in the drawings by way of example one or more electrical steering propeller propulsion systems, the weapon systems and the ship power supply system with electrical power. One or more AC generators which are driven by diesel engines and/or gas turbines supply power to the electrical propulsion motors for the additional propulsion systems, in the figures water jets for the ship.

One or more static DC/AC converters is or are arranged between at least one of the DC distribution busbars and at least one AC distribution busbar. The electrical power can flow via these converters from the DC distribution busbar to the AC distribution busbar, and vice versa. For example, in order to minimize IR emissions, the water jets can be started with electrical power from the BZAs. Furthermore, in an emergency, for example in the event of failure of the BZAs, the DC power supply system can be supplied with electrical power from the AC generators, which are driven by diesel engines and/or gas turbines, although, in this case, this may be without the IR signature being minimized.

When the operating mode of the ship is changed from water jet propulsion systems to cruise-speed propulsion systems, the reverse procedure is adopted for operation with a minimized IR signature. The power of the water jets is reduced to such an extent that there is still sufficient reduced pressure for exhaust suction/dissipation of the exhaust gases from the diesel engines and/or gas turbines in the coaxial exhaust gas nozzle segment. The DC/AC converters are activated, and the electrical power supply is transferred from the BZAs to the water jet or jets. The power of the AC generators is reduced to zero, and they are disconnected from the AC distribution busbar. The diesel engines and/or gas turbines are then slowed down and switched off. The power of the water jets can now likewise be reduced to zero, and they can be switched off.

The IR signature of surface navy ships is thus also minimized in the phases in which the high-speed propulsion systems are being switched on and off. It is thus not possible to use IR sensors to detect the position of a ship that is equipped in the manner according to an embodiment of the invention from relatively long range either at cruise speed with a fuel cell propulsion system or in the transitional phases to very high speed or from very high speed back down to cruise speed, or when traveling at very high speed.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein:

FIG. 2 shows the principle of the power supply system.

DETAILED DESCRIPTION OF THE PREFERRED EMBODIMENTS

Figure 1:
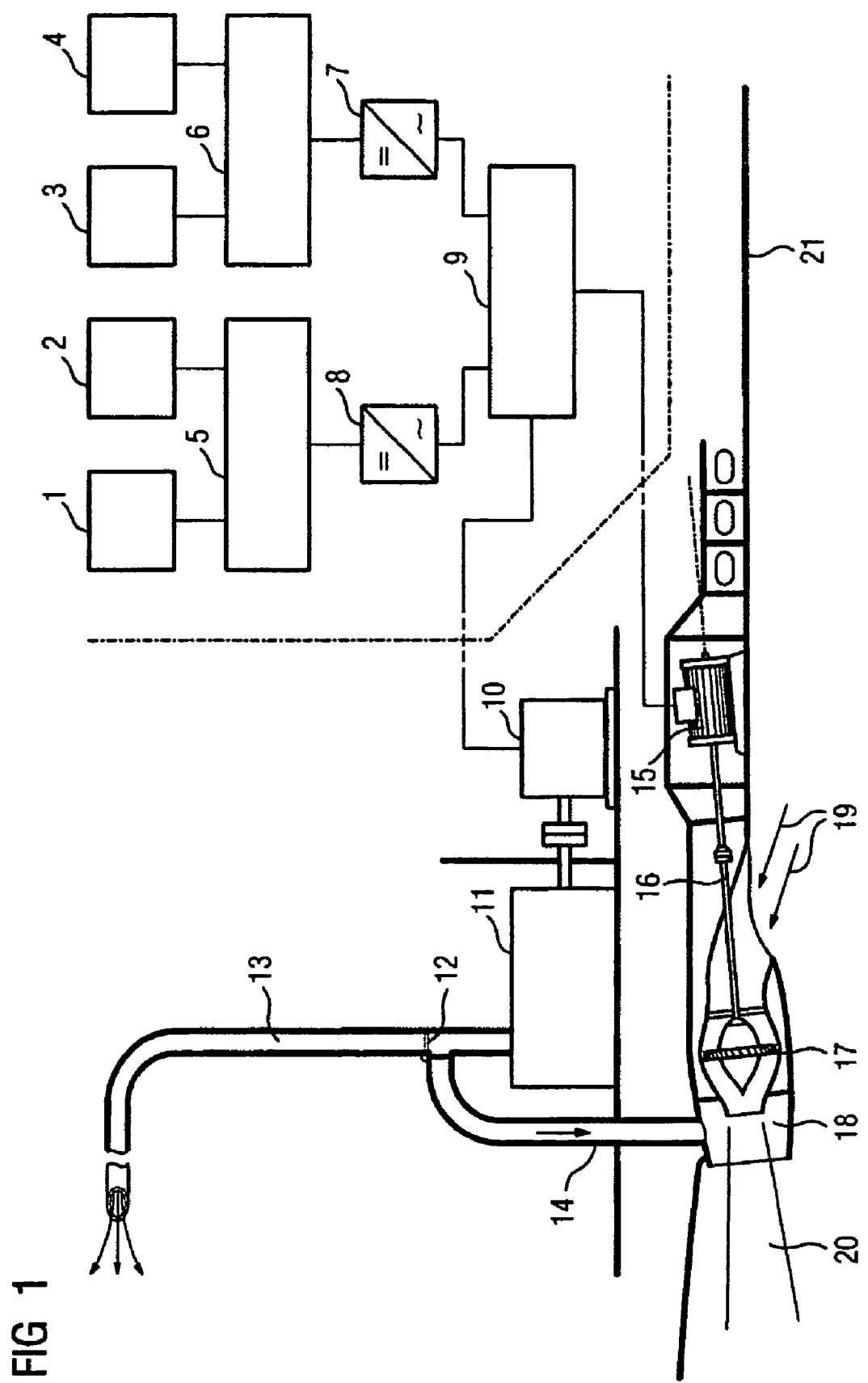
FIG. 1 shows a propulsion system with a low IR signature for a navy surface ship, in outline form, with system detail elements.

In FIGS. 1, 1, 2, 3 and 4 each denote a fuel cell unit which may optionally comprise a PEM cell block or a combination of a PEM cell block with another fuel cell with a higher operating temperature. A functional combination of the two different fuel cells is produced in a combination such as this. The electrical power which is produced by the fuel cell systems 1, 2, 3 and 4 is passed to electrical DC switching systems 5, 6 which, if required, may also be combined, and in which case more than two DC switching systems (electrical mechanisms) may also be arranged depending on the safety, reliability and redundancy requirements, and passed from here via DC/AC converters 7, 8 to the electrical switching system 9, an AC switching system.

Both the generator 10 and the electric motor 15 for the water jet 17 are switched by the electrical switching system 9. The generator 10 is connected to the gas turbine 11, whose exhaust gases are optionally passed to the atmosphere—switchably via the switching device 12, through the exhaust gas line 13—in special cases—or normally via the exhaust gas line 14 to the coaxial exhaust gas nozzle segment 18 of the water jet 17.

A propulsion shaft 16 is arranged between the electric motor 15 and the water jet 17. The water jet inlet into the water jet 17 is indicated by the arrows 19 and, as indicated, the water leaves the water jet 17 in the water exhaust gas cone 20. The lower edge of the ship is annotated 21. The water jet is located considerably below the waterline, generally between 5 and 12 m. The water pressure to be overcome corresponds to this.

In FIGS. 2, 22 and 23 each denote a DC busbar, and these busbars extend between the fuel cell units 26, 27, 28 and 29. The power from the DC busbars 22, 23 is passed to the AC busbar 30 via connecting lines 24, 25 with converters 40, 41. A steering propeller 33, which is shown by way of example, is connected to the DC busbar 23 and is supplied with power via an inverter 31, and another steering propeller 36, which is shown by way of example, is likewise supplied with power via the inverter 32. Normal propeller propulsion systems may, of course, also be used instead of the steering propellers.

The AC busbar 30 is supplied with power by the generators 34, 36, which are driven by gas turbines 35, 38. The water jet pairs 34, 35 are supplied with power from the AC busbar 30. The other switching devices, which are illustrated only in an indicated form, are located between the individual busbars, which are shown by way of example in FIG. 2, and their parts. A bow thruster 42 is also connected to the DC busbar 22 and, because its power level is low and it is used only rarely, it may be fed from the DC power supply system. The DC busbars 22, 23 are connected to one another by means of a transfer line 37 so that, overall, this results in a complete ship power supply system, although FIG. 2 illustrates only the major components.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. An electrical power supply system for a ship, comprising:
   a DC power supply system; and
   an AC power supply system with generators, the generators being motor-driven, wherein the AC and DC power supply systems are connected to one another such that electrical power is interchangable between them, and wherein electrical power is drawn from the DC power supply system and transferred to the AC power supply system,
   wherein the system includes a control system which operates at a higher level than the AC and DC switching systems with their respective monitoring and control system, which higher-level control system matches the power generation and the power consumption of all the power generators and loads to one another.

2. The electrical power supply system as claimed in claim 1, wherein exhaust gases from engine drives for the generators are introduced into a reduced-pressure area at the base of the ship, with reduced pressure in the reduced pressure area being produced during operation of a high-speed propulsion system, including the AC power supply system, by the water accelerated at least one of directly and indirectly by the high-speed propulsion system.

3. The electrical power supply system as claimed in claim 2, wherein the exhaust gases, when using at least one of a gas turbine and a diesel engine as the engine drives, are introduced into coaxial exhaust-gas nozzle segments of water jets for supplying power to electric motors for water jets as the high-speed propulsion systems, with the water jets being designed to operate at up to ten meters below the waterline of the ship.

4. The electrical power supply system as claimed in claim 2, wherein the exhaust gases, when using diesel engines for the power supply for electric motors for propeller propulsion systems as high-speed propulsion systems, are introduced into an underwater nozzle system.

5. The electrical power supply system as claimed in claim 2, wherein a bypass is provided for the exhaust gases from the engine drives to an outlet above the waterline, which may be used for starting the engine drives.

6. The electrical power supply system as claimed in claim 2, wherein the exhaust gases, when using diesel engines for the power supply for electric motors for propeller propulsion systems as high-speed propulsion systems, are introduced into at least one of a Venturi tube system and an annular gas outlet nozzle.

7. The electrical power supply system as claimed in claim 3, wherein a bypass is provided for the exhaust gases from the engine drives to an outlet above the waterline, which may be used for starting the engine drives.

8. The electrical power supply system as claimed in claim 4, wherein a bypass is provided for the exhaust gases from the engine drives to an outlet above the waterline, which may be used for starting the engine drives.

9. The electrical power supply system as claimed in claim 1, wherein the DC power supply system is fed from fuel cells that have a DC switching system with a monitoring and control system.

10. The electrical power supply system as claimed in claim 9, wherein the system is connected to an exhaust gas supply system, which allows switching of the exhaust gas supply.

11. The electrical power supply system as claimed in claim 10, wherein the exhaust gas supply system includes a compressed-air feed subsystem.

12. The electrical power supply system as claimed in claim 11, wherein the compressed-air feed subsystem one of blows out the reduced-pressure areas and accelerates the flow of the exhaust gases during a starting process.

13. The electrical power supply system as claimed in claim 1, wherein power generation units for the high-speed propulsion systems have an AC switching system with a monitoring and control system.

14. The electrical power supply system as claimed in claim 13, wherein the system is connected to an exhaust gas supply system, which allows switching of the exhaust gas supply.

15. The electrical power supply system as claimed in claim 1, wherein an AC monitoring and control system is connected to pressure sensors and to pressure sensors in exhaust gas lines.

16. The electrical power supply system as claimed in claim 1, wherein an AC monitoring and control system is connected to valve and flap control devices.

17. The electrical power supply system as claimed in claim 1, wherein an AC monitoring and control system has an exhaust gas supply switching logic, and wherein an automation system based on the same technology is provided for the propulsion systems.

18. The electrical power supply system as claimed in claim 1, wherein the AC and DC switching systems are designed such that a maximum amount of power is feedable from the AC power supply system to the DC power supply system when the power demand in the DC power supply system is high.

19. The electrical power supply system as claimed in claim 1, wherein the AC and DC systems are designed such that the DC power supply system can be supplied with power continuously from the AC power supply system when fuel cells for power generation fail at least partially.

20. The electrical power supply system as claimed in claim 1, wherein the DC power supply system has high-dynamic-response energy stores.

21. The electrical power supply system as claimed in claim 1, wherein the system is for a navy ship operatable with a low IR signature, which is in the form of an "All Electric Ship" (AES).

22. The electrical power supply system as claimed in claim 1, wherein a DC power supply, fed from fuel cells, is included in the DC power supply system and is a power supply system for normal speed propulsion systems.

23. The electrical power supply system as claimed in claim 1, wherein the AC power supply system includes generators for supplying power for high-speed propulsion systems.

24. The electrical power supply system as claimed in claim 23, wherein the generators are motor-driven by at least one of a gas turbine and a diesel engine.

25. The electrical power supply system as claimed in claim 1, wherein electrical power is drawn from the DC power supply system and transferred to the AC power supply system for starting the engine drives.

26. The electrical power supply system as claimed in claim 1, wherein fuel cells for the DC power supply system are both fuel cells whose power is quickly controllable and fuel cells whose power is slowly increasable.

27. The electrical power supply system as claimed in claim 26, wherein fuel cells are at least one of DMFC cells, SOFC cells and other cells which operate in the temperature range above the PEM cells.

28. The electrical power supply system as claimed in claim 26, wherein fuel cells are at least one of DMFC cells, SOFC cells and other cells which operate in the temperature range of approximately 80 degrees C.

29. The electrical power supply system as claimed in claim 26, wherein different fuel cells operate in media and heat combination, and jointly feed electrical power into the DC power supply system.

30. The electrical power supply system as claimed in claim 26, wherein a capacity of the fuel cells whose power is quickly controllable is designed such that at least the starting processes of high-speed propulsion systems can be carried out.

31. The electrical power supply system as claimed in claim 26, wherein fuel cells with a different dynamic response are combined to form technically interacting units, and are distributed between different ship areas.

32. The electrical power supply system as claimed in claim 1, wherein an AC monitoring and control system is connected to reduced-pressure sensors in exhaust gas outlet reduced-pressure areas, and to pressure sensors in exhaust gas lines.

33. The electrical power supply system as claimed in claim 1, wherein an AC monitoring and control system is connected to valve and flap control devices and to pressure sensors.

34. The electrical power supply system as claimed in claim 1, wherein an AC monitoring and control system includes an exhaust gas supply switching logic with actuating rate ramps and interlocks and wherein an automation system based on the same technology is provided for the propulsion systems.

35. The electrical power supply system as claimed in claim 1, wherein the system includes a control system which operates at a higher level than the AC and DC switching systems with their respective monitoring and control system, which higher-level control system matches the power generation and the power consumption of all the power generators and loads to one another with respect to the different dynamic responses of the power generators and loads.

36. The electrical power supply system as claimed in claim 1, wherein the AC and DC switching systems are designed such that a maximum amount of power is feedable from the AC power supply system to the DC power supply system when using high-energy weapons.

37. The electrical power supply system as claimed in claim 18, wherein the AC and DC systems are designed such that the DC power supply system can be supplied with power continuously from the AC power supply system when fuel cells for power generation fail at least partially.

38. The electrical power supply system as claimed in claim 1, wherein the DC power supply system has at least one of rechargeable battery banks and flywheel energy stores.

39. The electrical power supply system as claimed in claim 22, wherein the AC power supply system includes generators for supplying power for high-speed propulsion systems.

40. An electrical power supply system, comprising:
   an AC power supply system; and
   a DC power supply system, wherein fuel cells for the DC power supply system are both fuel cells whose power is quickly controllable and fuel cells whose power is slowly increasable;
   wherein the AC and the DC power supply systems are connected to one another such that electrical power is interchangable between them,
   wherein fuel cells with a different dynamic response are combined to form technically interacting units, and are distributed between different ship areas.

41. The electrical power supply system as claimed in claim 40, wherein different fuel cells operate in media and heat combination, and jointly feed electrical power into the DC power supply system.

42. The electrical power supply system as claimed in claim 40, wherein a capacity of the fuel cells whose power is quickly controllable is designed such that at least the starting processes of high-speed propulsion systems can be carried out.

43. The electrical power supply system as claimed in claim 40, wherein fuel cells are at least one of DMFC cells, SOFC cells and other cells which operate in the temperature range above the PEM cells.

44. The electrical power supply system as claimed in claim 40, wherein fuel cells are at least one of DMFC cells, SOFC cells and other cells which operate in the temperature range of approximately 80 degrees C.

45. The electrical power supply system as claimed in claim 40, wherein an AC monitoring and control system includes an exhaust gas supply switching logic with actuating rate ramps and interlocks and wherein an automation system based on the same technology is provided for the propulsion systems.

* * * * *